United States Patent
Nakano et al.

(10) Patent No.: US 12,283,092 B2
(45) Date of Patent: Apr. 22, 2025

(54) INFORMATION PROCESSING DEVICE, LEARNING METHOD, AND RECORDING MEDIUM

(71) Applicant: NEC Corporation, Tokyo (JP)

(72) Inventors: Gaku Nakano, Tokyo (JP); Yuichi Nakatani, Tokyo (JP); Tetsuo Inoshita, Tokyo (JP); Katsuhiko Takahashi, Tokyo (JP); Asuka Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 415 days.

(21) Appl. No.: 17/775,607

(22) PCT Filed: Nov. 13, 2019

(86) PCT No.: PCT/JP2019/044527
§ 371 (c)(1),
(2) Date: May 10, 2022

(87) PCT Pub. No.: WO2021/095160
PCT Pub. Date: May 20, 2021

(65) Prior Publication Data
US 2022/0398833 A1  Dec. 15, 2022

(51) Int. Cl.
*G06V 10/774* (2022.01)
*G06N 3/045* (2023.01)

(52) U.S. Cl.
CPC ......... *G06V 10/7747* (2022.01); *G06N 3/045* (2023.01)

(58) Field of Classification Search
CPC ........... G06V 10/7747; G06V 10/7792; G06V 10/82; G06N 3/045; G06N 3/08; G06N 20/00
USPC .......................................................... 382/159
See application file for complete search history.

(56) References Cited

U.S. PATENT DOCUMENTS

| | | | | |
|---|---|---|---|---|
| 5,956,702 | A | * 9/1999 | Matsuoka | G06N 3/049 704/250 |
| 2013/0097103 | A1 | 4/2013 | Chari et al. | |
| 2015/0134578 | A1 | * 5/2015 | Tamatsu | G06N 3/045 706/12 |
| 2019/0073588 | A1 | 3/2019 | Kawaguchi | |
| 2019/0287515 | A1 | * 9/2019 | Li | G06N 3/084 |
| 2020/0110982 | A1 | * 4/2020 | Gou | G06N 3/088 |

(Continued)

FOREIGN PATENT DOCUMENTS

| | | | | |
|---|---|---|---|---|
| EP | 3757895 | * 12/2020 | | G06N 3/088 |
| JP | 6208552 | * 10/2017 | | G06N 3/084 |
| JP | 2019-046380 A | 3/2019 | | |

OTHER PUBLICATIONS

International Search Report for PCT Application No. PCT/JP2019/044527, mailed on Feb. 10, 2020.

(Continued)

*Primary Examiner* — Jerome Grant, II

(57) ABSTRACT

The information processing device performs distillation learning of a student model using unknown data which a teacher model has not learned. The label distribution determination unit outputs an arbitrary label for the unknown data. The data generation unit outputs new generated data using an arbitrary label and unknown data as inputs. The distillation learning part performs distillation learning of the student model using the teacher model and using the generated data as an input.

10 Claims, 5 Drawing Sheets

(56) References Cited

U.S. PATENT DOCUMENTS

2020/0311540 A1* 10/2020 Chakraborty ............ G06N 3/08
2022/0351024 A1* 11/2022 Khayrallah ............ G06N 3/063

OTHER PUBLICATIONS

Hinton et al., "Distilling the Knowledge in a Neural Network", NIPS 2014 workshop.
Kulkarni et al., "Knowledge distillation using unlabeled mismatched images", arXiv:1703. 07131.
Nayak, Gaurav Kumar et al., "Zero-Shot Knowledge Distillation in Deep Networks", chapters 2, 3, arXiv.org [online], arXiv:1905. 08114v1, Cornell University, May 20, 2019, [retrieved on Jan. 31, 2020], Internet:<URL: https://arxi v.org/pdf/1905. 08114v1.pdf>.
Chen, Hanting et al., "Data-Free Learning of Student Networks", chapter 3, arXiv.org [online], arXiv:1904.01186v3, Cornell University, Sep. 5, 2019, [retrieved on Jan. 31, 2020], Internet: <https://arxiv.org/pdf/1904.01186v3.pdf>.
Kono, Shinsaku et al., "Proposal of Synthetic Data Generation Method Focusing on Class Imbalance in Model Compression". Information Processing Society of Japan Publication Database, Jul. 11, 2018, vol. 11, No. 2, pp. 7-15, Chapters 1, 3, [retrieved on Jul. 18, 2018], Internet :<URL:https://ipsj.ixsq.nii.ac.jp/ej/?action=repository_uri&item_id=190375&file_id=1&file_no=1>, ISSN: 1882-7799.

* cited by examiner

INFORMATION PROCESSING DEVICE, LEARNING METHOD, AND RECORDING MEDIUM

This application is a National Stage Entry of PCT/JP2019/044527 filed on Nov. 13, 2019, the contents of all of which are incorporated herein by reference, in their entirety.

TECHNICAL FIELD

The present invention relates to a learning method of a neural network utilizing distillation.

BACKGROUND ART

In machine learning, a highly accurate learning model can be created by constructing a neural network having deep layers. Such a learning model is called deep learning and includes millions to billions of neural networks. In deep learning, it is known that the more complex the learning model and the deeper the layers, i.e., the more the number of the neural networks, the higher the accuracy. On the other hand, since the enlargement of the model requires more computer memories, there has been proposed a method of constructing a smaller model while maintaining the performance of a huge model.

Non-Patent Document 1 and Patent Document 1 describe a learning method referred to as a Knowledge Distillation (hereinafter referred to as "distillation") that imitates a huge learned model (hereinafter referred to as "teacher model") with a small-scale model (hereinafter referred to as "student model"). In this method, the data used in learning the teacher model is used as the input to the teacher model and the student model, and learning of the student model is performed so that the output of the student model approaches the weighted average of the prediction label outputted by the teacher model and the true label given by the learning data. Since the learning method described in Non-Patent Document 1 uses a weighted average label, the same data as used for learning the teacher model is required at the time of learning the student model. However, since a large amount of learning data is required for deep learning, it may be difficult to retain the learning data itself from the viewpoint of capacity limitation of the storage medium, protection of the privacy information included in the data, copyright of the data, and the like.

Non-Patent Document 2 describes distillation learning using data that is unknown to the teacher model, i.e., data for which the true label associated with the input data is unknown, without using the data used at the time of learning the teacher model. This learning method performs learning of the student model so as to approach the predicted label of the teacher model for the unknown data.

PRECEDING TECHNICAL REFERENCES

Patent Document

Patent Document 1: Japanese Patent Application Laid-open under No. 2019-046380

Non-Patent Document

Non-Patent Document 1: Hinton et al., "Distilling the Knowledge in a Neural Network", NIPS 2014 workshop Non-Patent Document 2: Kulkami et al., "Knowledge distillation using unlabeled mismatched images", arXiv: 1703.07131.

SUMMARY

Problem to be Solved

Since the learning method described in Non-Patent Document 2 does not have a true label unlike the method described in Non-Patent Document 1, only the predicted label of the teacher model is used, rather than the weighted average. However, if the unknown data is not close to the learning data, the distribution of predicted labels by the teacher model may be biased. For example, for a multi-class classifier of Hiragana in which a teacher model uses images as the input, if only alphabetical images can be prepared as the unknown data, the multi-class classifier may classify any alphabetical characters as some Hiragana in a biased manner (e.g., almost all images are classified as the Japanese character "あ"). In such a case, the student model can only learn the two-class classification of "あ" and others, and cannot inherit the original discrimination ability of the teacher model. As described above, in the method of Non-Patent Document 2, there is a possibility that a correct distillation learning cannot be performed even if unknown data is collected. This is because the bias of the predicted labels of the teacher model for unknown data (hereinafter referred to as "class imbalance") is not taken into consideration.

One object of the present invention is to realize distillation learning using unknown data, even if the learning data of the teacher model are not available and the distributions of the unknown data and the learning data are different.

Means for Solving the Problem

In order to solve the above problem, in one aspect of the present invention, there is provided an information processing device comprising:

a label distribution determination unit configured to output an arbitrary label for unknown data;

a data generation unit configured to outputs a new generated data using the arbitrary label and the unknown data as inputs; and a distillation learning unit configured perform distillation learning of a student model using a teacher model and using the generated data as an input.

In another aspect of the present invention, there is provided a learning method comprising:

outputting an arbitrary label for unknown data;

outputting a new generated data using the arbitrary label and the unknown data as inputs; and performing distillation learning of a student model using a teacher model and using the generated data as an input.

In still another aspect of the present invention, there is provided a recording medium recording a program that causes a computer to execute processing of:

outputting an arbitrary label for unknown data;

outputting a new generated data using the arbitrary label and the unknown data as inputs; and performing distillation learning of a student model using a teacher model and using the generated data as an input.

Effect

According to the present invention, distillation learning can be realized using the unknown data, even if the learning data of the teacher model are not available and the distributions of the unknown data and the learning data are different.

EXAMPLE EMBODIMENTS

Preferred example embodiments of the present invention will be described with reference to the accompanying drawings.

(Hardware Configuration)

Figure 1:
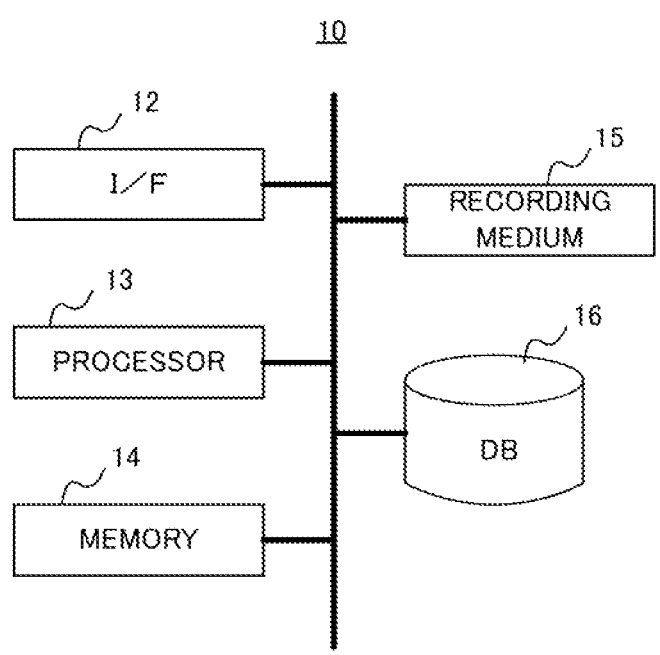
FIG. 1 illustrates a hardware configuration of a learning device according to a first example embodiment.

FIG. 1 is a block diagram illustrating a hardware configuration of a learning device according to an example embodiment of the information processing device of the present invention. As illustrated, the learning device 10 includes an interface (I/F) 12, a processor 13, a memory 14, a recording medium 15, and a database (DB) 16.

The interface 12 performs input and output of data to and from external devices. Specifically, the interface 12 acquires unknown data to be used by the learning device 10 from an external device.

The processor 13 is a computer such as a CPU (Central Processing Unit) or a CPU with a GPU (Graphics Processing Unit), and controls the learning device 10 by executing a program prepared in advance. Specifically, the processor 13 executes learning processing to be described later.

The memory 14 is composed of a ROM (Read Only Memory), a RAM (Random Access Memory), or the like. The memory 14 stores models of a neural network used by the learning device 10, specifically, a teacher model and a student model. The memory 14 is also used as a work memory during the execution of various processing by the processor 13.

The recording medium 15 is a non-volatile and non-transitory recording medium such as a disk-shaped recording medium, a semiconductor memory, or the like, and is formed to be detachable from the learning device 10. The recording medium 15 records various programs to be executed by the processor 13. When the learning device 10 executes various kinds of processing, a program recorded on the recording medium 15 is loaded into the memory 14 and executed by the processor 13. The database 16 stores data inputted through the interface 12.

(Functional Configuration)

Figure 2:
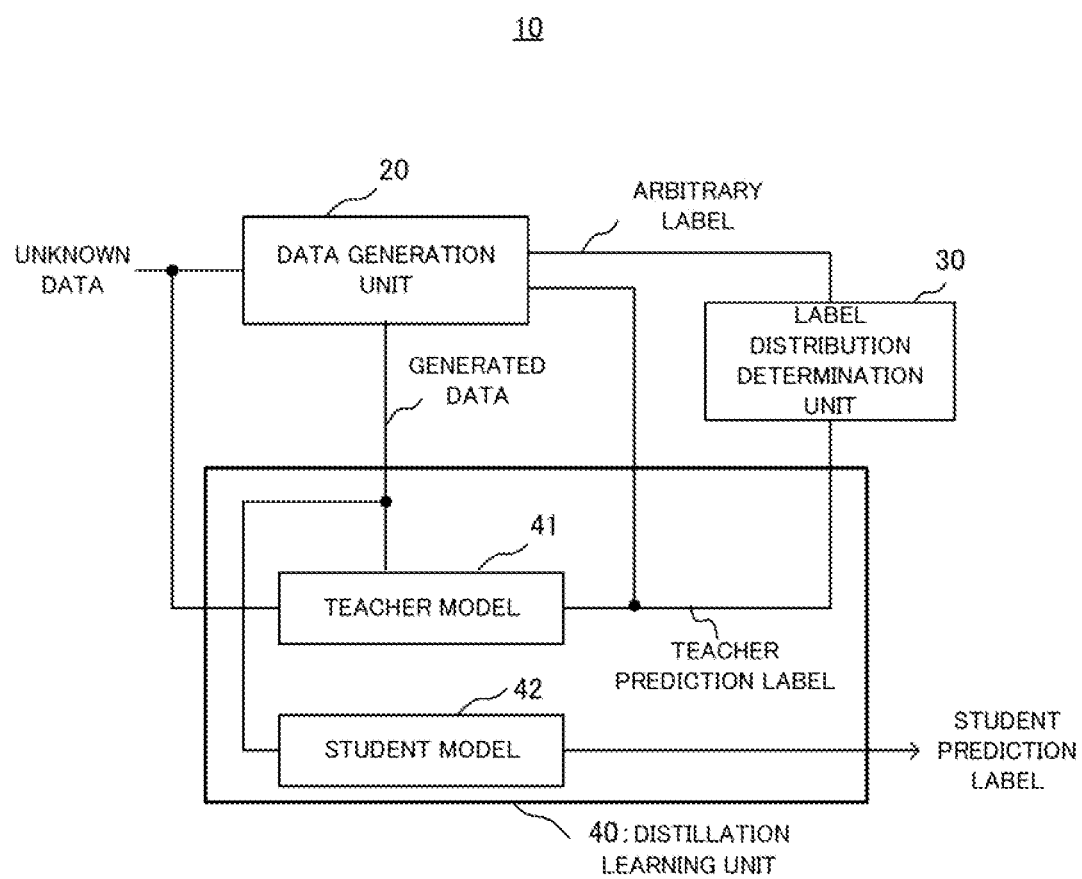
FIG. 2 illustrates a functional configuration of the learning device according to the first example embodiment.

Next, the functional configuration of the learning device 10 will be described. FIG. 2 is a block diagram showing the functional configuration of the learning device 10 according to the first example embodiment. As illustrated, the learning device 10 includes a data generation unit 20, a label distribution determination unit 30, and a distillation learning unit 40. The distillation learning unit 40 includes a teacher model 41 and a student model 42.

The teacher model 41 is a model that has already been learned based on a sufficient amount of learning data. On the other hand, the student model 42 is a model to be learned by the learning device 10. The teacher model 41 and the student model 42 are both models using a neural network. The distillation learning unit 40 is a part for performing learning by distillation, and learns the student model 42 using the output of the teacher model 41.

When learning the student model 42 using the teacher model 41, if there is any learning data used for the learning of the teacher model 41, it can be used for learning the student model 42. In reality, however, there are cases in which the data used for the learning of the teacher model 41 cannot be used during the learning of the student model 42. In that case, data different from the data used for learning of the teacher model 41 (referred to as "unknown data") is used. However, since the distribution of the unknown data is unknown, the label predicted by the teacher model 41 with respect to the unknown data may have a bias between classes (this is referred to as "class imbalance"). If the class imbalance exists, the discrimination ability of the teacher model 41 cannot be successfully inherited to the student model 42.

In this view, in the learning device 10 of the present example embodiment, the data generation unit 20 and the label distribution determination unit 30 are provided to generate data having no class imbalance using the unknown data, and the generated data is inputted to the teacher model 41 and the student model 42 to perform learning by distillation.

Specifically, first, the unknown data is inputted to the teacher model 41, and the teacher model 41 outputs the prediction label of the teacher model 41 for the unknown data. Hereinafter, the label predicted by the teacher model 41 is referred to as a "teacher prediction label". The teacher prediction label for the unknown data is inputted to the data generation unit 20 and the label distribution determination unit 30.

As mentioned above, the teacher prediction labels for unknown data may have class imbalance. Therefore, the label distribution determination unit 30 determines the label distribution such that the class imbalance does not occur based on the teacher prediction label for the unknown data, determines an arbitrary label according to the label distribution, and outputs the label to the data generation unit 20.

The unknown data, the teacher prediction label for the unknown data, and an arbitrary label are inputted to the data generation unit 20. The data generation unit 20 generates new data (hereinafter referred to as "generated data") such that the prediction label of the teacher model approaches the arbitrary label based on the unknown data. Thus, the generated data becomes the data that follows the label distribution without class imbalance. Then, the generated data is inputted to the teacher model 41 and the student model 42, and is used as the learning data in the distillation learning unit 40.

In the distillation learning unit 40, the teacher model 41 generates the teacher prediction label for the generated data, and the student model 42 generates the prediction label for the generated data (hereinafter referred to as a "student prediction label"). Then, learning of the student model 42 is performed so that the student prediction label approaches the teacher prediction label.

(Learning Processing)

Figure 3:
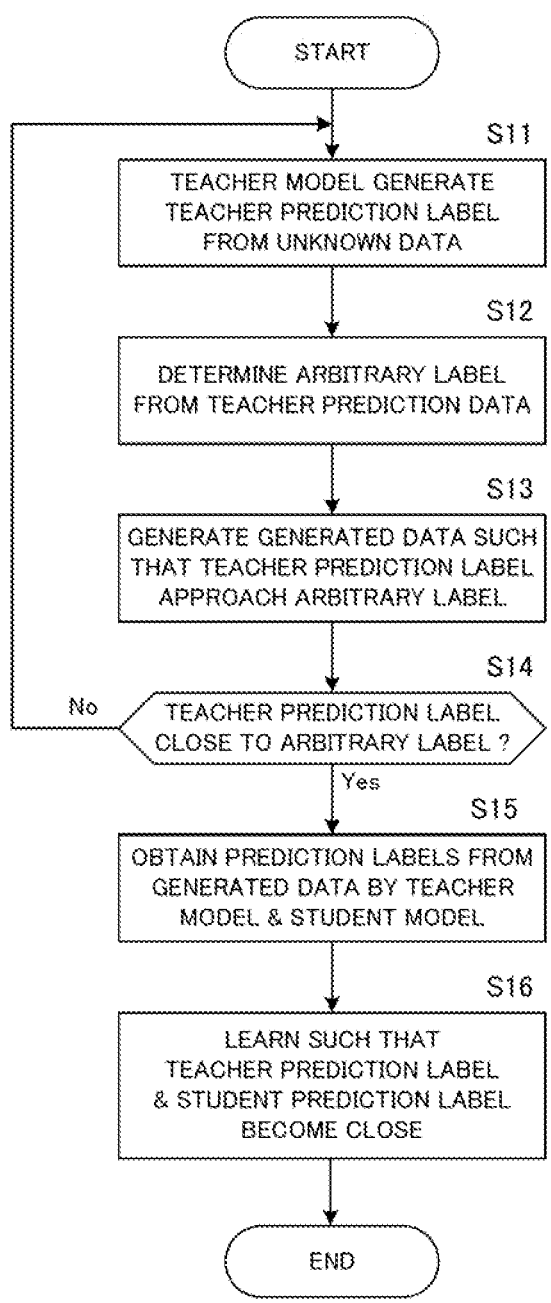
FIG. 3 is a flowchart of learning processing.

Next, the learning processing will be described. FIG. 3 is a flowchart of the learning processing performed by the learning device 10. This processing is implemented by the processor 13 shown in FIG. 1 executing a program prepared in advance and functioning as the elements shown in FIG. 2.

First, the unknown data is inputted to the teacher model 41, and the teacher model 41 outputs a teacher prediction label for the unknown data (Step S11). When the teacher prediction label is inputted, the label distribution determination unit 30 analyzes the probability distribution of all the inputted prediction labels, determines a label distribution such that the probability distribution between classes becomes equal, and determines an arbitrary label for each unknown data (Step S12).

Next, when the unknown data and the arbitrary label corresponding thereto are inputted, the data generation unit 20 generates the generated data such that the teacher prediction label for the unknown data approaches the arbitrary label (Step S13). The learning device 10 determines whether or not the teacher prediction label for the generated data is sufficiently close to the arbitrary label (Step S14), and repeats steps S11 to S13 until the generated data becomes sufficiently close to the arbitrary label.

When the teacher prediction label for the generated data becomes sufficiently close to the arbitrary label (Step S14: Yes), the distillation learning unit 40 inputs the generated data to each of the teacher model 41 and the student model 42, and obtains the teacher prediction label and the student prediction label for the generated data (Step S15). Then, the distillation learning unit 40 learns the student model 42 so that the teacher prediction label and the student prediction label become close to each other, and ends the process (Step S16).

As described above, in the present example embodiment, even when the data used for the learning of the teacher model is not available and the distribution of the learning data used for the learning of the teacher model is different from the distribution of the unknown data, distillation learning can be performed by generating the generated data having no class imbalance based on the unknown data.

Example

Next, an example of the present example embodiment will be described. In the following example, a teacher model is a deep neural network that receives an image as an input and classifies objects in the image into 100 classes. It is assumed that the teacher model has already been learned beforehand using the image group classified into 100 classes. The student model to be learned is a deep neural network that classifies 100 classes in the same way as the teacher model, but the number of neurons shall be equal to or less than the teacher model. Unlike the image group used for learning of the teacher model, the unknown data is a group of images classified into 10 classes in which the objects being captured are also different. Namely, each of the unknown data has a number indicating any of the 10 classes as a true label, but the label does not match the labels of 100 classes used by the teacher model. The number of unknown data may be equal to or greater than the image group of 100 classes, or may be smaller.

Figure 4:
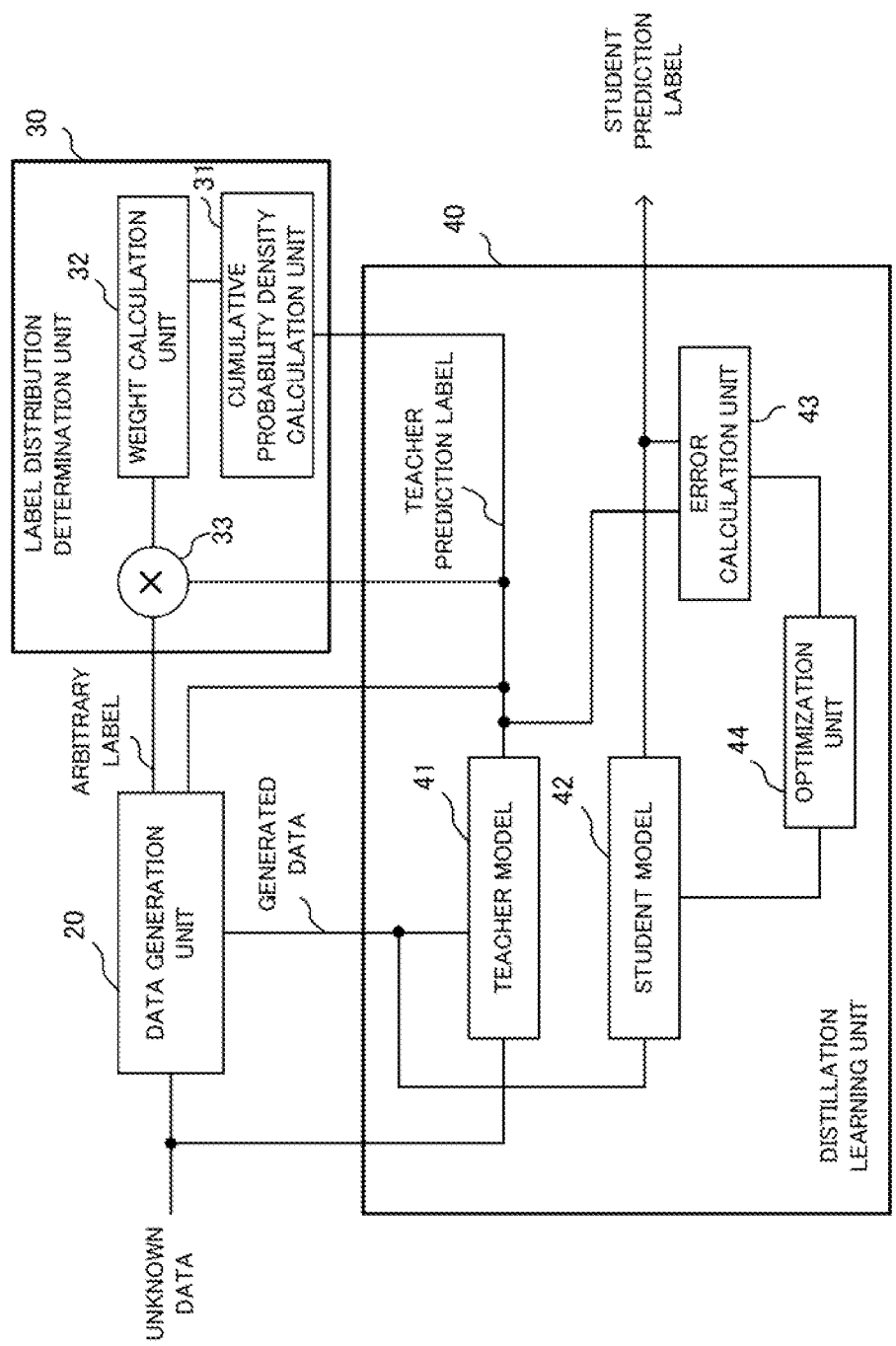
FIG. 4 illustrates a functional configuration of the learning device according to an example.

FIG. 4 is a block diagram illustrating the functional configuration of the learning device 10x according to the example of the present example embodiment. The basic configuration of the learning device 10x according to the example is the same as that of the learning device 10 shown in FIG. 2. However, as illustrated, the label distribution determination unit 30 includes a cumulative probability density calculation unit 31, a weight calculating unit 32, and a multiplier 33. Further, the distillation learning unit 40 includes a teacher model 41, a student model 42, an error calculation unit 43, and an optimization unit 44.

First, the teacher model 41 calculates a probability distribution of 100 classes for one unknown data and outputs a 100-dimensional vector which is a teacher prediction label. Each dimension of the vector represents the probability of each class. If the unknown data is a group of N images, the teacher prediction labels are N 100-dimensional vectors. The obtained teacher prediction labels are inputted to the label distribution determination unit 30.

In the label distribution determination unit 30, the accumulated probability density calculation unit 31 calculates the accumulated probability distribution of each class from the N 100-dimensional vectors inputted as the teacher prediction labels, obtains the accumulated probability density, and inputs the accumulated probability distribution to the weight calculation unit 32. The weight calculation unit 32 calculates a weight for each class so that the cumulative probability density of each class becomes equal. For example, the weight calculation unit 32 may use the reciprocal of the cumulative probability density as the weight, or the user may arbitrarily determine the weight to a part of the classes. Then, the multiplier 33 multiplies the weights to the teacher prediction label to determine an arbitrary label for the respective unknown data.

The label distribution determination unit 30 may provide a plurality of arbitrary labels for one inputted teacher prediction label, i.e., one 100-dimensional vector. In other words, the label distribution determination unit 30 may output a plurality of arbitrary 100-dimensional vectors for one unknown data. In this case, the number of the arbitrary labels outputted from the label distribution determination unit 30 becomes N or more.

When the unknown data and the corresponding arbitrary label are inputted, the data generation unit 20 generates the generated data such that the teacher prediction label becomes close to the arbitrary label. Specifically, the data generation unit 20 performs optimization in which the error between the teacher prediction label and the arbitrary label is used as the objective function and the unknown data is used as the variable. Incidentally, as described above, when a plurality of arbitrary labels is given to one unknown data, it is sufficient to perform the same optimization for each arbitrary label.

In this way, the data generation unit 20 and the label distribution determination unit 30 repeat generation of the generated label and the arbitrary label until the error between the teacher prediction label and the arbitrary label with respect to the generated data becomes sufficiently small. Thus, the cumulative probability density of each class of the teacher prediction labels for the generated data may become equal.

When the generated data is obtained in this way, the distillation learning unit 40 performs learning by distillation using the generated data. Specifically, the generated data is inputted to the teacher model 41 and the student model 42. The teacher model 41 outputs the teacher prediction label for the generated data, and the student model 42 outputs the student prediction label for the generated data. The error calculation unit 43 calculates an error between the teacher prediction label and the student prediction label, and inputs the error to the optimization unit 44. The optimization unit 44 optimizes the neurons of the student model 42 so that the error is reduced by using the error between the teacher prediction label and the student prediction label as the objective function.

Effect by Example Embodiment

As described above, according to the present example embodiment, distillation learning of the student model can be realized using the unknown data even if the learning data of the teacher model is not available and the distributions of the unknown data and the learning data are different. The reasons are as follows.

The first reason is that the class imbalance is eliminated by equalizing the cumulative probability density of the teacher prediction label with respect to the unknown data in the label distribution determination unit 30. The second reason is that the distribution of the learning data of the teacher model can be pseudo-reproduced by generating data that minimizes errors between the arbitrary label and the teacher prediction label in the data generation unit 20. The third reason is that, in the distillation learning unit 40, the label distribution determination unit 30 and the data generation unit 20 can theoretically calculate an infinite number of arbitrary labels and generated data until the distillation learning of the student model converges.

(Modifications)

This example embodiment is not limited to the above-described example. In this example embodiment, it is possible to apply various changes which can be understood by those skilled in the art to the above-described example. For example, the example embodiment can also be implemented by the forms in the following modifications.

(1) It is not necessary that the label distribution determination unit 30 equalizes the cumulative probability density of the label. For example, when an identification performance of a certain class is given priority, the probability distribution of the class may be relatively high rather than equal. Further, the label distribution determination unit 30 may include an input interface for receiving an arbitrary class distribution from the user.

(2) In the above-described example embodiment, the data generation unit 20 uses the unknown data as an initial value of the generated data and generates new generated data that minimizes an error between the prediction label obtained by inputting the generated data into the teacher model and the arbitrary label. Instead, the data generation unit 20 may use a random noise as the initial value of the generated data and generate new generated data that minimizes the error between the prediction label obtained by inputting the generated data into the teacher model and the arbitrary label.

(3) Data generation method in the data generation unit 20 is not limited to the above method. For example, a data-generation method called GAN (Generative Adversarial Network) or VAE (Variational Auto-Encoder) may be utilized.

(4) The number of student models is not limited to one. For example, when the number of dimensions of the prediction label is large, the prediction label may be divided into a plurality of vectors, and a plurality of student models corresponding to each of them may be learned.

Second Example Embodiment

Figure 5:
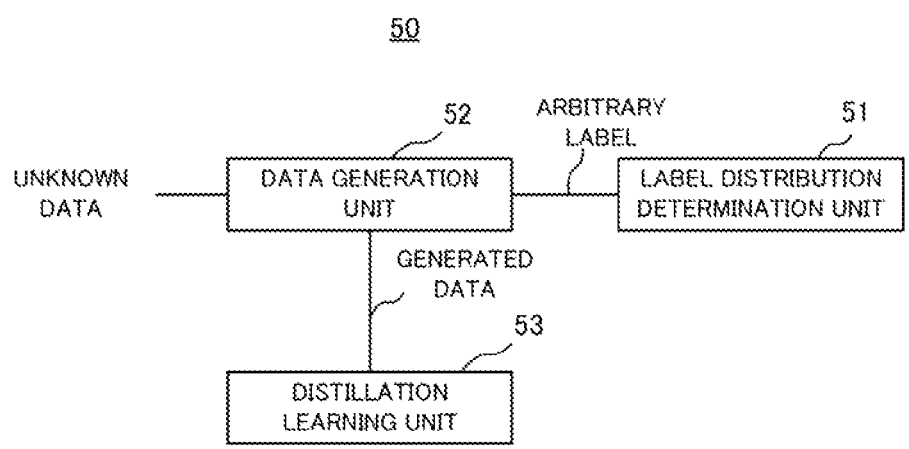
FIG. 5 illustrates a functional configuration of the information processing device according to a second example embodiment.

Next, a second example embodiment of the present invention will be described. FIG. 5 shows a functional configuration of the information processing device 50 according to the second example embodiment. The hardware configuration of the information processing device 50 is the same as that shown in FIG. 1.

The information processing device 50 performs distillation learning using unknown data that is not learned by the teacher model, and includes a label distribution determination unit 51, a data generation unit 52, and a distillation learning unit 53, as illustrated. The label distribution determination unit 51 outputs an arbitrary label for the unknown data. The data generation unit 52 outputs new generated data using the arbitrary label and unknown data as inputs. The distillation learning unit 53 performs distillation learning of the student model using the teacher model and using the generated data as an input. In this way, distillation learning can be performed using unknown data.

A part or all of the example embodiments described above may also be described as the following supplementary notes, but not limited thereto.

(Supplementary Note 1)

An information processing device comprising:
a label distribution determination unit configured to output an arbitrary label for unknown data;
a data generation unit configured to outputs a new generated data using the arbitrary label and the unknown data as inputs; and
a distillation learning unit configured perform distillation learning of a student model using a teacher model and using the generated data as an input.

(Supplementary Note 2)

The information processing device according to Supplementary note 1, wherein the label distribution determination unit calculates a cumulative probability density of a prediction label of the teacher model for the unknown data, and determines the arbitrary label based on the cumulative probability density.

(Supplementary Note 3)

The information processing device according to Supplementary note 2, wherein the label distribution determination unit determines the arbitrary label such that the cumulative probability density of each class of the prediction label of the teacher model is equal.

(Supplementary Note 4)

The information processing device according to Supplementary note 3, wherein the label distribution determination unit calculates a weight for each class such that the cumulative probability density of each class of the prediction label of the teacher model is equal, and multiplies the prediction label of the teacher model by the weight to determine the arbitrary label.

(Supplementary Note 5)

The information processing device according to any one of Supplementary notes 1 to 4, wherein the data generation unit uses the unknown data as an initial value of the generated data, and generates the new generated data that minimizes an error between the prediction label obtained by inputting the generated data to the teacher model and the arbitrary label.

(Supplementary Note 6)

The information processing device according to any one of Supplementary notes 1 to 4, wherein the data generation unit uses a random noise as an initial value of the generated data, and generates the new generated data that minimizes an error between a prediction label obtained by inputting the generated data to the teacher model and the arbitrary label.

(Supplementary Note 7)

The information processing device according to any one of Supplementary notes 1 to 6, wherein the unknown data is data different from data used for learning the teacher model.

(Supplementary Note 8)

The information processing device according to any one of Supplementary notes 1 to 7, wherein an information amount of the unknown data is smaller than an information amount of data used for learning of the teacher model.

(Supplementary Note 9)

A learning method comprising:
outputting an arbitrary label for unknown data;

outputting a new generated data using the arbitrary label and the unknown data as inputs; and performing distillation learning of a student model using a teacher model and using the generated data as an input.

(Supplementary Note 10)

A recording medium recording a program that causes a computer to execute processing of:

outputting an arbitrary label for unknown data;

outputting a new generated data using the arbitrary label and the unknown data as inputs; and performing distillation learning of a student model using a teacher model and using the generated data as an input.

While the present invention has been described with reference to the example embodiments and examples, the present invention is not limited to the above example embodiments and examples. Various changes which can be understood by those skilled in the art within the scope of the present invention can be made in the configuration and details of the present disclosure.

DESCRIPTION OF SYMBOLS 10, 10x learning device
20 Data Generation unit
30 Label distribution determination unit
40 Distillation learning unit
41 Teacher model
42 Student model
50 Information processing device

What is claimed is:

1. An information processing device comprising:
a memory storing instructions; and
one or more processors configured to execute the instructions to:
output an arbitrary label for unknown data;
output a new generated data using the arbitrary label and the unknown data as inputs; and
perform distillation learning of a student model using a teacher model and using the generated data as an input,
wherein the one or more processors generate the new generated data that minimizes an error between the prediction label obtained by inputting the generated data to the teacher model and the arbitrary label.

2. The information processing device according to claim 1, wherein the one or more processors calculate a cumulative probability density of a prediction label of the teacher model for the unknown data, and determine the arbitrary label based on the cumulative probability density.

3. The information processing device according to claim 2, wherein the one or more processors determine the arbitrary label such that the cumulative probability density of each class of the prediction label of the teacher model is equal.

4. The information processing device according to claim 3, wherein the one or more processors calculate a weight for each class such that the cumulative probability density of each class of the prediction label of the teacher model is equal, and multiply the prediction label of the teacher model by the weight to determine the arbitrary label.

5. The information processing device according to claim 1, wherein the one or more processors use the unknown data as an initial value of the generated data.

6. The information processing device according to claim 1, wherein the one or more processors use a random noise as an initial value of the generated data.

7. The information processing device according to claim 1, wherein the unknown data is data different from data used for learning the teacher model.

8. The information processing device according to claim 1, wherein an information amount of the unknown data is smaller than an information amount of data used for learning of the teacher model.

9. A learning method performed by a computer and comprising:
outputting an arbitrary label for unknown data;
outputting a new generated data using the arbitrary label and the unknown data as inputs; and
performing distillation learning of a student model using a teacher model and using the generated data as an input,
wherein the new generated data minimizes an error between the prediction label obtained by inputting the generated data to the teacher model and the arbitrary label.

10. A non-transitory computer-readable recording medium recording a program executable by a computer to perform processing comprising:
outputting an arbitrary label for unknown data;
outputting a new generated data using the arbitrary label and the unknown data as inputs; and
performing distillation learning of a student model using a teacher model and using the generated data as an input,
wherein the new generated data minimizes an error between the prediction label obtained by inputting the generated data to the teacher model and the arbitrary label.

* * * * *